UNITED STATES PATENT OFFICE.

BENNO HOMOLKA, OF FRANKFORT-ON-THE-MAIN, GERMANY, ASSIGNOR TO FARBWERKE VORM. MEISTER LUCIUS & BRÜNING, OF HOCHST-ON-THE-MAIN, GERMANY, A CORPORATION OF GERMANY.

OXID OF THIOINDIGO DYES.

No. 898,738.  Specification of Letters Patent.  Patented Sept. 15, 1908.

Application filed May 6, 1908. Serial No. 431,189.

*To all whom it may concern:*

Be it known that I, BENNO HOMOLKA, Ph. D., citizen of the Empire of Germany, and residing at Frankfort-on-the-Main, in the Empire of Germany, have invented certain new and useful Improvements in the Manufacture of Oxids of the Thioindigo Dyestuffs, of which the following is a specification.

This invention relates to a new class of technically useful products which are related to thio-indigo but contain more oxygen which products I have discovered and call thio-indigo oxids.

One method of obtaining these new products is by the action of oxidizing agents on thio-indigo dyestuffs; the latter appear to absorb one atomic proportion of oxygen.

When using the simplest body of thio-indigo the reaction occurs according to the following equation:

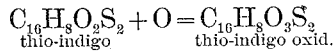
$$C_{16}H_8O_2S_2 + O = C_{16}H_8O_3S_2$$
$$\text{thio-indigo} \qquad \text{thio-indigo oxid.}$$

As oxidizing agents well-known powerful inorganic agents may be used, particularly suitable being nitric acid and chromic acid, of which the former generally acts already at ordinary temperature and the latter only when heated.

Example I: 10 parts by weight of thio-indigo are gradually introduced while stirring into 100–150 parts by weight of cold concentrated nitric acid. After 24–48 hours, the mixture is diluted with water, the thio-indigo oxid collected on a filter, washed and dried.

Example II: 50 parts by weight of thio-indigo paste of 20 per cent. strength are digested for some time, say for about 10 to 12 hours, on the water bath with a solution of 30 parts by weight of sodium bichromate in 150 parts by weight of water and 45 parts by weight of sulfuric acid of 66° Bé. specific gravity. The thio-indigo oxid thus formed is collected on filters and then washed and dried.

The thio-indigo oxid is a red, crystalline powder, insoluble in water, also insoluble or almost insoluble in the usual organic solvents; but it is soluble to a great extent with a red color in boiling chloroform and boiling xylene. On cooling, these solutions yield beautiful red crystals. In concentrated sulfuric acid the thio-indigo oxid is readily soluble with a reddish-violet color. In analogous manner other bodies of this group may be treated, for instance homologous or substituted thio-indigo dyestuffs, for instance those containing Cl, Br, $(OCH_3)$ or $(SC_2H_5)$.

The thio-indigo oxids generally dissolve, when heated, both in dilute caustic soda lyes and in aqueous solutions of the neutral sulfites of alkalies or alkaline earths. The latter solutions, heated with dilute mineral acids, yield red precipitates which can also be produced in this way on the textile fiber. For this purpose the tissue may be impregnated or printed with a solution of, for instance, thio-indigo oxid or dimethoxythio-indigo oxid in a solution of sodium sulfite, and then dried and passed through warm diluted hydrochloric acid. Thus fast red dyes are obtained.

Alkaline reducing agents dissolve the thio-indigo oxids, thus forming vats which can be used in the usual manner for dyeing.

Having now described my invention, what I claim is:

1. The process for the manufacture of oxids of the thio-indigo dyestuffs which consists in treating the thio-indigo dyestuffs with oxidizing agents.

2. As a new product the oxid obtainable by oxidation of a thio-indigo dyestuff, being a red crystalline powder, insoluble in water, ether and ligroin, soluble with a red color in boiling chloroform and xylene, also soluble with a reddish-violet color in concentrated sulfuric acid, dissolving with an orange-yellow color in dilute caustic soda-lyes and in aqueous solutions of the neutral sulfites, which latter solution yields, when heated, with dilute mineral acids a red precipitate.

In testimony whereof, I affix my signature in presence of two witnesses.

BENNO HOMOLKA.

Witnesses:
 JEAN GRUND,
 CARL GRUND.